Feb. 1, 1949. G. E. FRANCK 2,460,633
VALVE MEANS
Filed Nov. 1, 1946
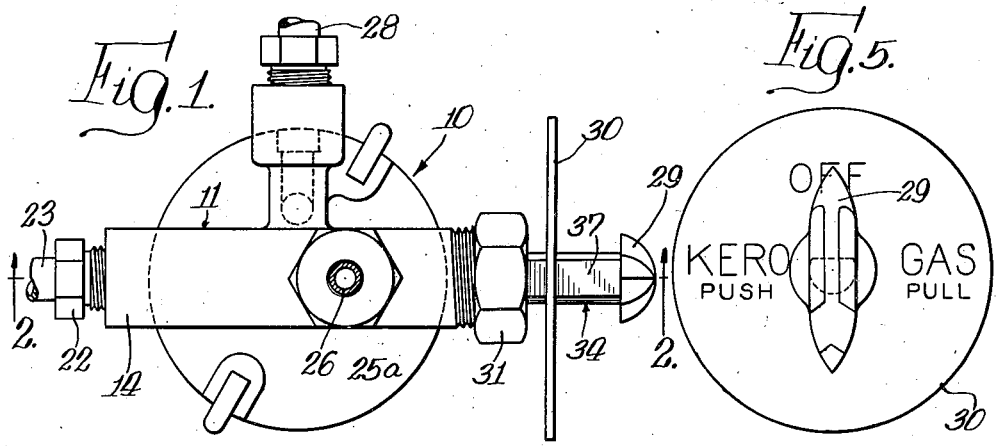
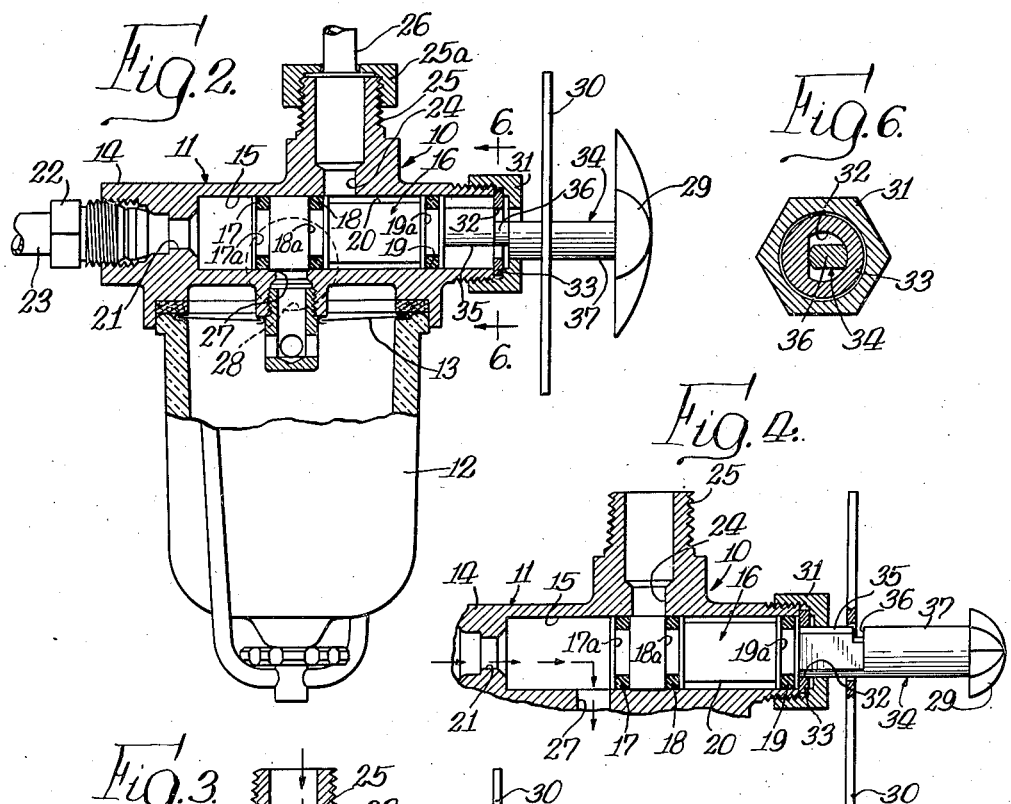
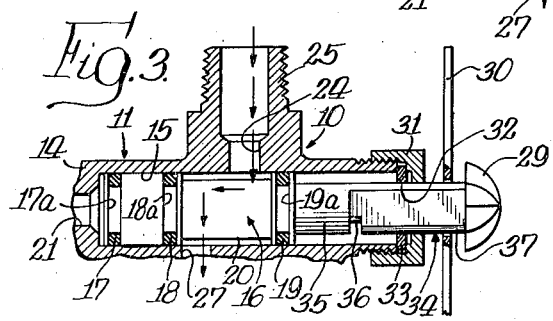
INVENTOR.
George E. Franck,
BY Chritton, Schroeder,
Merriam & Hofgren, his Attys.

Patented Feb. 1, 1949

2,460,633

UNITED STATES PATENT OFFICE 2,460,633

VALVE MEANS

George E. Franck, Riverside, Ill., assignor to The Imperial Brass Manufacturing Company, Chicago, Ill., a corporation of Illinois Application November 1, 1946, Serial No. 707,131

4 Claims. (Cl. 251—76)

This invention relates to valve means and more particularly to a selector valve means adapted for the handling of fuels for internal combustion engines.

One object of the invention is to provide a new and improved valve means of the selector type.

Another object is to provide a valve means of the selector type being positive in its operation and requiring movement in two planes in order to pass from one selected position to another.

A further object is to provide indicating means associated with the various positions of the valve means.

Other objects and advantages will become apparent from the following detailed description taken in connection with the accompanying drawings in which, Fig. 1 is a plan view, partly in section, of a valve casing and strainer bowl embodying the invention;

Fig. 2 is a vertical section along lines 2—2 of Fig. 1;

Figs. 3 and 4 are views of the valve portion of Fig. 2 showing the valve in different positions;

Fig. 5 is an elevation showing the pointer and indicating dial; and,

Fig. 6 is a vertical section along lines 6—6 of Fig. 2.

While the invention may be susceptible of various modifications and alternative constructions, it is herein shown and will hereinafter be described in a preferred embodiment. It is not intended, however, that the invention is to be limited thereby to the specific construction disclosed. On the contrary, it is intended to cover all modifications and alternative constructions falling within the spirit and scope of the invention as defined in the appended claims.

For the purposes of disclosure, the valve means is herein shown and will hereinafter be described as embodied in a strainer of the type employed in the fuel systems of internal combustion engines. Such a strainer comprises, generally, a body 10 serving as a housing for valve means, generally designated 11, and as a support for a bowl or cup 12 containing the strainer means proper. The strainer may take a variety of forms, but is here shown as an annular gauze screen element 13.

The valve means comprises a casing 14 having a bore 15 formed therein. Slidable and rotatable within the bore is a valve element 16 of the spool type having a land 17 adjacent the left-hand end (as seen in Fig. 2), a second land 18 spaced from the first, a third land 19 at the right-hand end of the valve element, and a reduced portion 20 between the lands 18 and 19. In the embodiment shown, the lands are O rings snugly fitting in recessed portions 17a, 18a and 19a of the valve element.

Opening to one end of the bore is a first inlet 21 having an internally threaded portion for the reception of a fitting 22 securing a conduit 23. A second inlet 24 opens radially to the bore intermediate the ends thereof and is connected by means of an externally threaded boss 25 on the casing and a fitting 25a to a second conduit 26. A common outlet 27 is provided intermediate the ends of the bore which opens to the strainer 12 below the gauze screen element 13. An outlet 28 from the strainer opens to the strainer above the gauze screening element so that all fuel entering the strainer passes through the gauze screen prior to entering the outlet 28.

As is clear from the foregoing, when the valve is in the position shown in Fig. 3 lands 17 and 18 prevent communication between the inlet 21 and the outlet 27, but permit communication between the inlet 24 and the outlet by means of the reduced portion 20.

With the valve in the position shown in Fig. 4, communication is permitted between the inlet 21 and the outlet 27 while communication between the inlet 24 and the outlet is prevented. In the position shown in Fig. 2, the lands 17 and 18 prevent communication to the outlet from either of the inlets.

In the particular embodiment shown, the two inlets are assumed to connect to two sources of fuel, namely kerosene and gasoline. It is common in some internal combustion engines, such as those for use in tractors, to provide a fuel such as gasoline for starting the engine and for the warming up period and to then run the engine on the cheaper fuel, namely kerosene, after the engine is thoroughly warmed. It is one of the purposes of this invention to provide a valve means for such an installation to assure positive selection of the desired fuel. In order to insure that the valve is manipulated to its correct position, and to guard against "mental lapses" on the part of the operator, means are provided requiring the operator not only to push or pull the valve to the position establishing communication with the proper inlet, but also to compel the operator to rotate the valve before the desired position can be attained. To this end, the device is so arranged that the pointer 29 associated with the indicating panel 30 cannot be rotated to indicate one or the other of the fuels without first bringing the valve to a neutral or off position, and then rotating the valve clockwise or counterclockwise before shifting the valve to the desired position.

To accomplish this end, the end of the bore is opposite the inlet 21 closed by a closure 31 having an opening 32 therein of a certain particular shape. In the embodiment shown, the particular shape is that of a D and is formed by a D washer 33, although it will be clear that other shapes, such as a square or an off-center circle, may be used. The valve means is manually actuable by means of the valve stem 34 which is divided into three sections, a first section 35 having the same cross sectional shape as the opening 32, a central section 36 which is rotatable within the opening and a third section 37 having the same cross sectional shape as the opening but angularly displaced from the first section. The valve stem is permissibly rotatable to cause either the first or third section to register with the closure.

With the valve in the position shown in Fig. 3, the third section of the valve stem 37 is in registry with the opening 32. Moving the valve stem to the right to the position shown in Fig. 2, will cause the valve means to slide to the right within the bore until the beginning of the first section 35 strikes the sides of the opening halting further progress. At that time, the valve means will be in the off position, and the central section 36 is positioned within the opening. In order to move the valve to the position shown in Fig. 4, the valve stem must be rotated until the first section is registerable with the opening whereupon the valve means may be withdrawn further to the right until the position shown in Fig. 4 is attained. It can thus be seen that the valve cannot be moved from the "gasoline" position to the "kerosene" position, or vice versa, without first rotating the valve while in the off position.

I claim as my invention:

1. Valve means comprising: a casing having a bore formed therein, a plurality of inlets opening to said bore and an outlet leading from said bore, a spool valve element slidably and rotatably mounted within said bore having a first position permitting communication between one of said inlets and said outlet, a second position preventing communication between said inlets and said outlet and a third position permitting communication between another of said inlets and said outlet, a closure for one end of said bore, a manually actuable valve stem connected to said spool valve element and extending through an opening in said closure, said valve stem having a first section having the same cross sectional shape as said opening and slidable therethrough in one angular position and having a central section slidable through said opening in all angular positions and having a third section having the same cross sectional shape as said opening and slidable therethrough in another angular position, whereby said valve stem may be manually moved from the said second position wherein said central section is positioned in said opening to said first or to said third position by manually rotating the valve stem to cause one or the other of said first or third sections of said valve stem to register with said opening.

2. Valve means comprising: a casing having a bore formed therein, a pair of inlets opening to said bore and an outlet leading from said bore, a spool valve element slidable and rotatably mounted within said bore having a first position permitting communication between one of said inlets and said outlet, a second position preventing communication between said inlets and said outlet and a third position permitting communication between the other of said inlets and said outlet, a closure for one end of said bore, a manually actuable valve stem connected to said spool valve element and extending through an opening in said closure, said valve stem having a first section having the same cross sectional shape as said opening and slidable therethrough in one angular position and having a central section slidable through said opening in all angular positions and having a third section angularly displaced from said first section and having the same cross sectional shape as said opening and being slidable therethrough in another angular position, whereby said valve stem may be manually moved from the said second position wherein said central section is positioned in said opening to said first or to said third position by manually rotating the valve stem clockwise or counterclockwise to cause one or the other of said first or third sections of said valve stem to register with the opening.

3. Valve means comprising: a casing having a bore formed therein, a plurality of inlets opening to said bore, an outlet leading from said bore, a spool valve element slidably and rotatably mounted within said bore having a first position permitting communication between one of said inlets and said outlet, a second position preventing communication between said inlets and said outlet and a third position permitting communication between another of said inlets and said outlet, a closure for one end of said bore, a manually actuable valve stem connected to said spool valve element and extending through an opening in said closure, said valve stem having a first section having the same cross sectional shape as said opening and slidable therethrough in one angular position, and having a central section slidable through said opening in all angular positions and having a third section angularly displaced from said first section and having the same cross sectional shape as said opening and being slidable therethrough in another angular position, whereby said valve stem may be manually rotated clockwise or counterclockwise while in said second position wherein said central section is positioned in said opening so as to cause the first or third section of said valve stem to register with the opening thereby permitting said valve to be manually moved inwardly or outwardly to said first or to said third position.

4. Valve means comprising: a casing having a bore formed therein, a pair of inlets opening to said bore, an outlet leading from said bore, a spool valve element slidably and rotatably mounted within said bore having a plurality of lands formed therein, said lands comprising O-rings, and said valve having a first position permitting communication between one of said inlets and said outlet, a second position preventing communication between said inlets and said outlet and a third position permitting communication between another of said inlets and said outlet, a closure for one end of said bore, a manually actuable valve stem connected to said spool valve element and extending through an opening in said closure, said valve stem having a first section having the same cross sectional shape as said opening and slidable therethrough in one angular position and having a central section slidable through said opening in all angular positions and having a third section angularly displaced from said first section and having the same cross sectional shape as said opening and being slidable therethrough in another angular position, whereby said valve stem may be manually rotated clockwise or counterclockwise while in said second angular position wherein said central section is positioned in said opening to cause the first or third section to register with said opening thereby permitting said valve to be manually moved inwardly or outwardly to said first or third position, and indicating means associated with said valve stem to visually indicate the position of said valve.

GEORGE E. FRANCK.

No references cited.